(No Model.)

E. F. MILLER.
WIRE TIGHTENER.

No. 446,688. Patented Feb. 17, 1891.

Witnesses:
F. Schmeloch.
G. M. Chamberlain.

Inventor,
Edwin F. Miller
by Chapin & Co.
Attys

UNITED STATES PATENT OFFICE.

EDWIN F. MILLER, OF WILLIAMSBURG, MASSACHUSETTS.

WIRE-TIGHTENER.

SPECIFICATION forming part of Letters Patent No. 446,688, dated February 17, 1891.

Application filed June 9, 1890. Serial No. 354,704. (No model.)

*To all whom it may concern:*

Be it known that I, EDWIN F. MILLER, a citizen of the United States, residing at Williamsburg, in the county of Hampshire and State of Massachusetts, have invented new and useful Improvements in Implements for Straining Up Barb-Wire, of which the following is a specification.

This invention relates to an improved implement for stretching wire or drawing the same taut, being especially designed for use in the construction of barb-wire fences; and the invention consists in an implement which is constructed substantially as will hereinafter more fully appear, and be set forth in the claim.

Reference is to be had to the accompanying drawings, in which—

Figure 1:
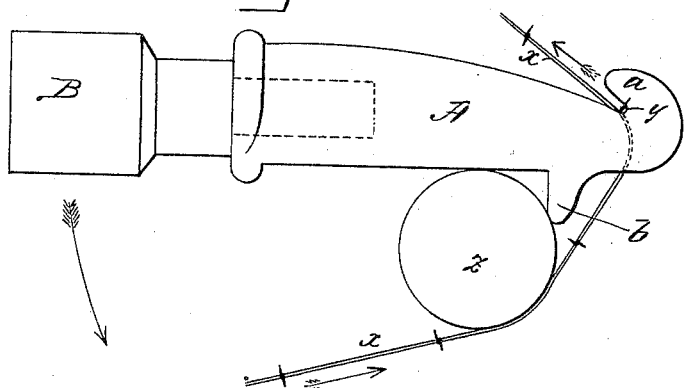
Figure 2:
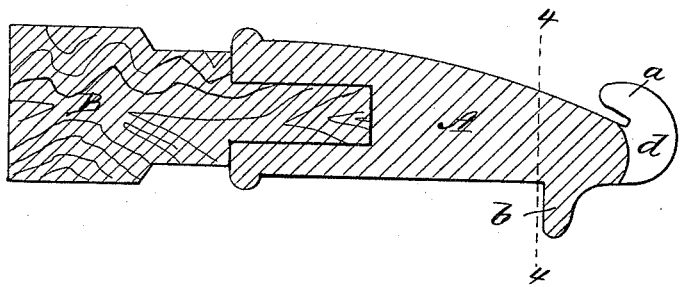
Figure 4:
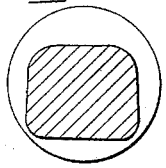
Figure 3:
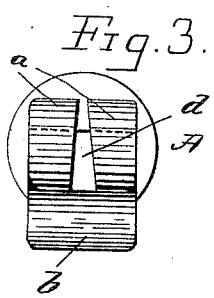

Figure 1 is a plan view of the improved implement in its operative relation with a section of barbed wire and with a post upon which the said wire is to be drawn under tension. Fig. 2 is a central longitudinal section. Fig. 3 is an end view of the operating end or working-head of the implement; and Fig. 4 is a cross-section on line 4 4, Fig. 2.

A represents the working-head, preferably formed of cast-iron, although it may be formed of other metal or material, and B is a wooden handle suitably fitted in and securely attached to said head. The head A at its extremity is formed with the lateral and also rearwardly-projecting hook-extension $a$, which forms a V-shaped rest for the barb, and on its side opposite from said hook and somewhat farther toward the handle end of the implement the head is provided with the laterally-extended shoulder-extension $b$. The head is provided within its forward extremity with a longitudinal slot $d$, which is in a plane at or about at right angles to the width of the said hook $a$, dividing same into two members.

In the use of the implement the wire $x$ is, by a part thereof adjacent to one of its barbs $y$, passed within the slot $d$, with said barb engaged by the hook $a$, and the shoulder-extension $b$ is then placed in contact with the post or stanchion, (indicated by $z$,) to which the wire is to be drawn taut. Said shoulder affords a fulcrum on which the implement may be swung around the post, effecting the drawing up of the wire, as will be easily understood, especially on an inspection of the drawings. It is preferred to make the base of the slot of a rounded form, as indicated, as a better seat is thus formed for the wire, there being then no sharp corners which are liable to cut the wire; and it will be further seen, as a preferred form therefor, that the slot $d$ widens as it recedes from hook $a$ to permit the entrance thereinto of a barb next behind the hook-engaged one as the straining up of the wire is effected. The back of the head adjacent the shoulder $b$ is formed with a flat back, as indicated in Fig. 4, for the purpose of avoiding the galling or scarring of young trees when such serve as posts, as is frequently the case.

What I claim as my invention is—

An implement for stretching or straining up barb-wire in the construction of barb-wire fences, consisting of a working-head having a suitable handle and provided at its extremity with the hook $a$, which has an extension laterally and sharply toward the handle end of the implement, whereby the V-shaped barb-rest is formed at the base of said hook, there being in the extremity of said head the transverse groove or slot $d$, having a rounded base, as shown, for the disposition and rest therein and thereon of the portion of the wire next forward of an engaged barb, said slot having the diverging walls, as shown, and said head having on its side opposite the hook the laterally-extended shoulder $b$, as set forth.

EDWIN F. MILLER.

Witnesses:
 H. A. CHAPIN,
 WM. S. BELLOWS.